Dec. 20, 1960  B. L. ZEMAN  2,965,187
TILTABLE ENGINE GUARD FOR TRACTOR VEHICLES
Filed Aug. 28, 1956  2 Sheets-Sheet 2

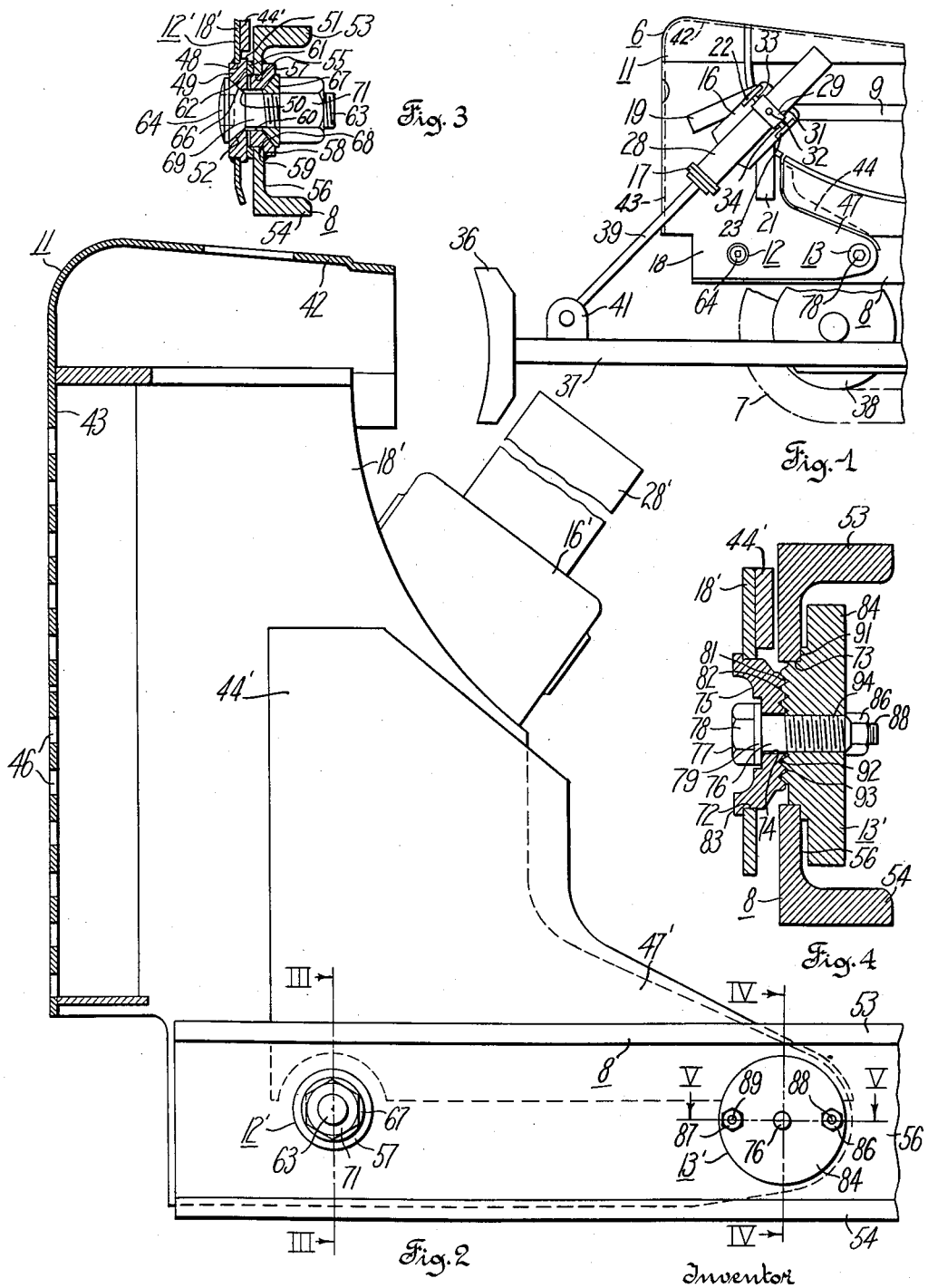

Inventor
Bernard L. Zeman
By Charles L. Schwab
Attorney

United States Patent Office

2,965,187
Patented Dec. 20, 1960

2,965,187

TILTABLE ENGINE GUARD FOR TRACTOR VEHICLES

Bernard L. Zeman, Springfield, Ill., assignor to Allis-Chalmers Manufacturing Company, Milwaukee, Wis.

Filed Aug. 28, 1956, Ser. No. 606,728

10 Claims. (Cl. 180—69)

This invention is related to a tractor type vehicle and more particularly to a mounting structure for attaching an engine guard onto the main frame of the tractor vehicle wherein the guard is adaptable to serve also as a support for lift mechanisms which are used to raise and lower the bulldozer blade.

In the copending H. H. Bidwell application entitled "Bulldozer Tractor," U.S. Serial No. 565,908, now Patent No. 2,921,392, there is taught a combination engine guard and mounting structure for lift mechanisms such as cable sheaves or hydraulic rams and where the guard permits servicing of the engine without the necessity of separating the guard from the main frame of the tractor. The present invention deals with the mounting structure for connecting this type of guard, as well as the type which does not mount lift mechanisms, onto the main frame of a tractor vehicle.

Heretofore, tilting engine guards which were adaptable for supporting lift mechanisms were pivoted on large diameter trunnions which were journaed in a bearing structure mounted on the main frame of the tractor. To hold the guard erect and to prevent relative movement between the guard and the main frame, a multiplicity of fastening members were required to secure the guard to the main frame as well as to fenders and other supporting structures of the tractor, the principal disadvantages of these previous mountings being that installation of the guard on the tractor required considerable time and effort since special methods are required in final assembly to bring the various bores into proper alignment to receive the several fastening members. Also, releasing of the several fastening means to permit tilting was time consuming and the mounting structure itself necessitated sturdy supports and braces to withstand the tremendous loads which are transmitted when lift mechanisms for a ground engaging tool are mounted on the guard. A further difficulty presented by previous pivotal mountings is that both the trunnion and bearings of the pivot connection are subjected to severe wear and will become loosen allowing the guard to vibrate.

It is then an object of this invention to provide an improved mounting structure for the type of guard hereinbefore outlined which will satisfactorily overcome the difficulties and disadvantages hereinbefore pointed out.

It is a further object of this invention to provide an improved mounting structure for the type of guard hereinbefore outlined which permits service accessibility without removal of the guard from the main frame of the tractor vehicle.

It is a further object of this invention to provide an improved mounting structure for the type of guard herein before outlined which simplifies installation of the guard on the main frame of the tractor vehicle.

It is a further object of the invention to provide a pivotal connection having a long life which permits forward tilting of the guard relative to the main frame.

Another object of this invention is to provide a releasable anchor connection for the engine guard which is easily installed and released yet when tightened will prevent relative movement between the engine guard and the tractor main frame.

Other and further objects and advantages of the invention will be apparent to those skilled in the art from the following detailed description when it is read in conjunction with the annexed drawings.

As shown in the drawings:

Fig. 1 is a side view of a crawler tractor having a bulldozer structure operated by hydraulic rams which are mounted on the engine guard;

Fig. 2 is a vertical section view of the engine guard showing the mounting structure which attaches it to the main frame;

Fig. 3 is a section view of the pivotal connection along lines III—III in Fig. 2;

Fig. 4 is a section view of the anchor connection taken along lines IV—IV in Fig. 2.

Figure 5:
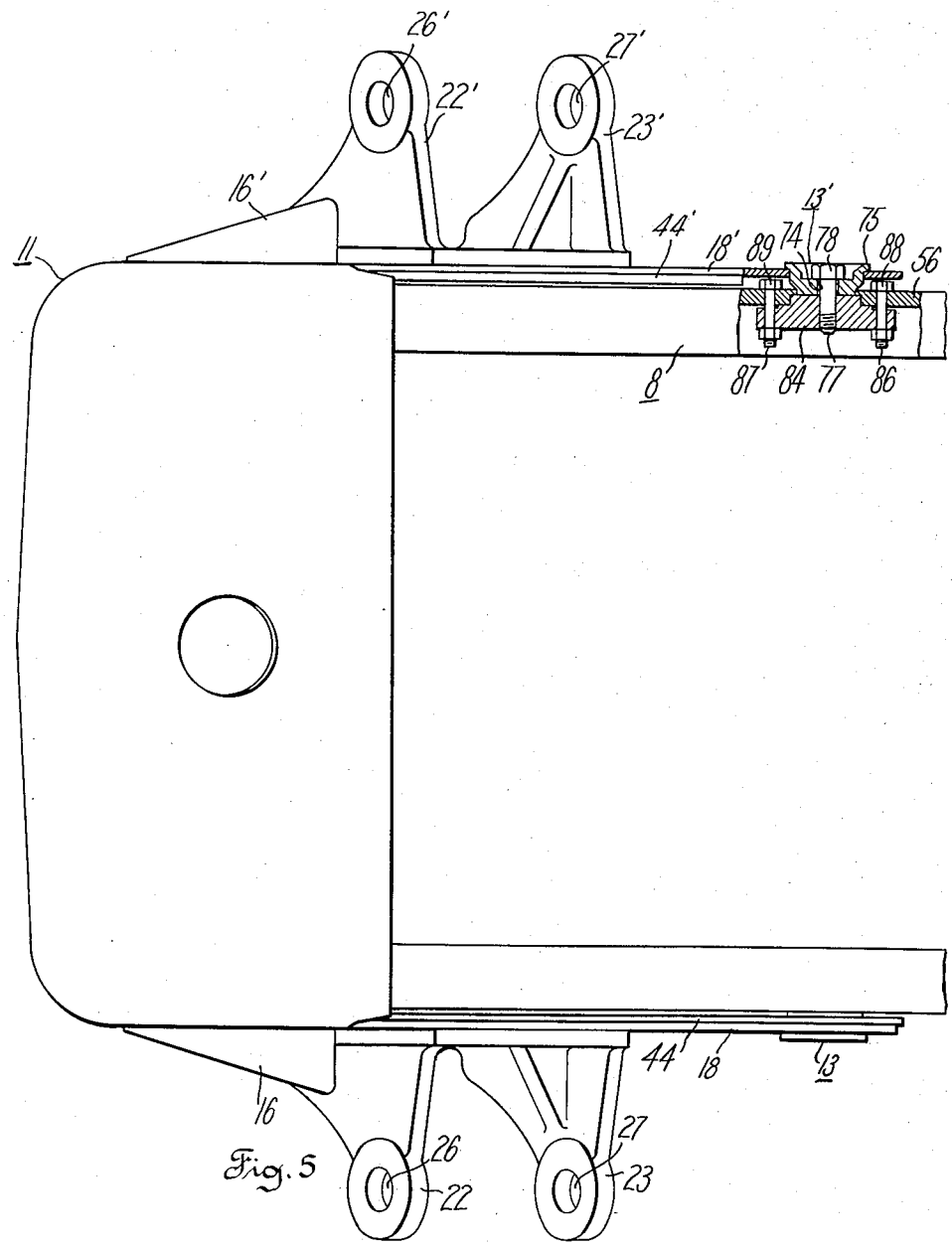
Fig. 5 is the top view of the engine guard with a portion cut away to show a section of the anchor connection taken along lines V—V in Fig. 2.

Referring to Fig. 1, the crawler tractor 6 has self-laying track units 7 disposed at laterally opposite sides of a main frame 8. The track units 7, respectively, are connected to a final drive housing at the rear of the main frame 8. An engine 9 is mounted on the forward portion of the main frame 8. A transmission mechanism, not shown, transmits power from the engine 9 to drive the track units 7. A front mounted guard 11 forms a protective shield about the forward portion of the engine 9.

The lower forward part of the guard 11 is attached to the main frame 8 by pivotal connecting structures 12, 12' and is anchored to the main frame 8 by anchor connections 13, 13' spaced rearwardly from the pivotal connections 12, 12'. A bracket structure indicated generally at 16 for mounting a hydraulic jack 17 is attached on the side plate 18 of the guard 11. The bracket 16 includes supports 19 and 21 which are welded to the side plate 18 to provide greater rigidity.

Referring to Figs. 1 and 5, a pair of spaced arms 22 and 23 are provided with aligned bearing openings 26 and 27. A hydraulic cylinder 28 is universally mounted in the bracket 16 by a universal joint structure indicated generally at 29. The universal joint structure 29 includes a yoke 31 in which the hydraulic cylinder 28 is pivotally mounted to permit movement about a transverse axis at the pivot 32. The yoke 31 is provided with trunnions 33 and 34 which are journaled, respectively, in the bearing openings 26 and 27, thereby permitting pivotal movement of the cylinder 28 about an axis normal to the transverse axis of the pivot 32. A bulldozer blade 36 is mounted on push beams 37 which are attached at their rear ends to the track frames 38. A double acting hydraulic ram 39 is pivotally mounted on brackets 41 which is secured to the push beams 37.

Referring to Fig. 5, at the side of the tractor opposite bracket 16, a bracket 16' having arms 22', 23' with aligned bearing openings 26', 27' is provided to universally mount a hydraulic cylinder 28', shown in Fig. 2, in the same manner as described for mounting cylinder 28 in bracket 16.

Referring to Figs. 2, 3, 4 and 5, a top plate 42, front plate 43 and side plates 18 and 18' are all rigidly interconnected as by welding or by integral construction. The front plate 43 of the engine guard 11 is provided with a multiplicity of air vents 46. Plates 44 and 44' are respectively attached, as by welding, on the inside of plates 18 and 18' for the purpose of adding rigidity to the wing portions 47 and 47' and for otherwise providing a more rigid structure. Wing portions indicated generally at 47 and 47' are integral rearward extensions of the lower portions of the side plates 18 and 18' respectively. The lower forward portion of the side plate 18 is provided with an enlarged bore opening 48. A bushing member 49 is received into the opening 48 and there fixedly attached, as by welding. The bushing member 49 presents a flanged portion 51 which presses against the inside of the side plate 18. The bushing member 49 is of circular shape and has a transverse bore 50 presenting a conical tapered face 52. The tractor main frame 8 includes lengths of channel iron which are welded together to form the frame. The flanges 53 and 54 of the length of the channel iron, which constitutes the side of main frame 8, are interconnected by the web 56 and are inwardly extending. An enlarged bore opening 55 is provided in the web 56 of the forward portion of the main frame 8, this opening 55 being in alignment with the enlarged opening of the side plate 18. A collar member 57 is received into the opening 55 of the web 56 with an abutting portion 58 in contact with the inside of the web. The collar 57 is provided with a transverse bore 60 which is in alignment with the bore of bushing member 51, and presents a face 59. Face 59 tapers oppositely to the taper of face 52 presented by the bushing member 49. Interposed between the bushing member 49 and the main frame 8 is a washer 61. The washer 61 is welded to the outside of the web 56 in aligned relation to opening 55 and serves to space the side plate 18 away from the associated side of the main frame 8. The washer 61 also presents a wearing surface 62 which abuts against the bushing member 49. When the guard 11 is tilted, the bushing member 49 moves relative to the washer 61.

A tension member 63 is piloted through the aligned bushing bores presented by the bushing member 49 and collar member 57. The socket head 64 of the tension member 63 has a conical taper which presents a bearing surface 66 complementary to the conical tapered face 52 of the bushing member 49. The split ring or bearing member 67 presents a conical tapered bearing surface 68 complementary to the face 59 of the collar member 57. Bearing member 67 is carried on the shank 69 of the tension member 63 and is interposed between the collar member 57 and an adjusting nut 71. The adjusting nut 71 is in threaded engagement with the tension member 63. When the tension member 63 is tightened, as by inserting a suitable wrench into the socket head 64, the nut 71, being in contact with the bearing member 67, is operable to adjust the bearing member toward the head 64 thereby forcing the opposed bearing surfaces 66 and 68 into abutting thrust transmitting relationship with the faces 52 and 59, respectively, of the bushing member 49 and collar member 57.

Spaced rearwardly of the bushing member 49 and on a horizontal axis therewith is the anchoring connection 13' shown in Fig. 4. Aligned bore openings 72 and 73 are provided in the wing portion 47' of plate 18' and the web 56, respectively. A block member 75 is received into the bore opening 72 and rigidly attached thereto as by welding. A flange portion 83 is in abutting relationship with the outside surface of plate 18' immediately surrounding the opening 72. The face of the block member 75 which is in confronting relation to the main frame 8 is provided with serrated edges or ridges 81 and grooves 82 which extend horizontally. The block member 75 is also provided with a transverse bore 74 through which is piloted the shank 76 of cap screw 77. Interposed between the head 78 of the cap screw 77 and the block 75 is a lock washer 79. An abutting member 84 is connected to the main frame 8 by a pair of longitudinally spaced nuts 86 and 87 and bolts 88 and 89. A portion of the abutting member 84 is received into the enlarged opening 73 provided in the web 56 of the main frame 8, and an abutting portion 91 is in contact with the inside surface of the web 56. The surface of the abutting member 84 which is in confronting relationship to block 75 is provided with a surface having a series of parallel serrated edges or ridges 92 and grooves 93 in mating relationship with the serrations of the block member 75. The abutting member 84 is provided with a threaded bore 94 in which is received the cap screw 77. The bore 74 is sufficiently large to permit alignment with threaded bore 94 thereby compensating for any standard manufacturing variations between center distances of the pivotal connection 12' and the anchor connection 13' as well as variations in vertical alignment of bore 94 in the abutting member 84. This arrangement eliminates any special method of fitting the engine guard 6 to the main frame 8 in the assembly operation and also makes possible interchangeability of components for the engine guard mounting structure. The cap screw 77 when tightened, as by a suitable wrench, urges the corrugated surfaces of the block member 75 and the abutting member 84 into interlocking relationship. The ridges 81 of the block 75 are received in the grooves 93 of the abutting member 84 and ridges 92 of the abutting member are received in grooves 82 of the block member. Any thrust load transmitted by the wing 47 to the block member 75 and thence to the abutting member 84 is carried by the root area of the interlocked ridges and grooves thereby presenting a large shear resisting area. In this arrangement, there is no relative movement between the guard 11 and the main frame 8 and the cap screw 77 carries only a tensile stress.

It should be understood that the pivotal connecting structure 12 and the anchor connection 13 shown in Fig. 1 are similar in construction to pivotal connecting structure 12' and anchor connection 13' shown in Figs. 2, 3 and 4.

The guard described herein is very easily installed, is self-aligning and requires only tightening of the tension member at the pivot connections 12 and 12' and the cap screw at the anchor connections 13 and 13'. Upon release of the cap screws, by unscrewing them from the abutting members and removing them from the bore of the block members, separation of the interlocked lands and grooves is permitted and the guard 11 is free to pivot forward relative to the main frame 8 about a transverse pivot axis at tension member 63. An advantage provided by this type of pivotal mounting is accessibility to service the engine or to replace parts and other engine accessories, with a minimum of down time. Another advantage is long life since when either bearing surfaces 66 and 68 or faces 52 and 59 becomes worn, parts need not be replaced since tightening of the tension member 63 will compensate for any wear and the pivot connections 12 and 12' will remain tight fits.

It should be understood that the particular forms and details described herein illustrate only one embodiment of the invention and that this is not intended to limit the patent granted hereon otherwise than is necessitated by the scope of the appended claims.

What is claimed is:

1. In a vehicle having a main frame, and having a guard means disposed at one end of said vehicle, said guard means including laterally spaced wall portions, a pair of spaced coaxial pivot means respectively for pivotally connecting the spaced wall portions of said guard means on said main frame at opposite lateral sides of said vehicle, each of said pivot means including a first pivot member having a tapered opening, means for attaching said first pivot member on one of said wall portions, a second pivot member having a tapered opening, means for attaching the second pivot member on said main frame, said openings tapering oppositely of each other and being aligned on an axis extending transversely of the vehicle, connecting means including a tension member extending through said openings, said connecting means also including bearing means having oppositely tapering conical surfaces and being carried on said tensioning member, the tapered surfaces of said bearing means respectively being complementary to and juxtaposed with the tapered openings of said pivot members, said tension member being operative to draw said pivot members together in order to maintain said bearing means in seated engagement with said tapered openings; and fastening means including a releasable means for releasably connecting said guard means to said main frame independently of and spaced from said pivot means, and upon release of said fastening means said guard means being pivotable about said transverse axis.

2. The combination set forth in claim 1 wherein the bores of said pivot members taper oppositely of and way from each other and wherein said bearing means include a pair of bearing members respectively having tapered surfaces complementary to and juxtaposed with said tapered bores.

3. The combination set forth in claim 1 wherein said fastening means comprise a first set of serrations on said main frame, a second set of serrations on said wall complementary to and juxtaposed with said first set, and releasable means for maintaining said first and second sets of serrations in interlocking engagement.

4. The combination set forth in claim 2 wherein said tension member includes a head which forms one of said pair of bearing members.

5. The combination set forth in claim 2 wherein said fastening means comprise a first set of parallel serrations on each of opposite lateral sides of said main frame, a second set of parallel serrations on each of said wall portions complementary to and juxtaposed with said first set, and releasable means for maintaining said first and second sets of serrations in interlocking engagement.

6. In a vehicle having a main frame and a rigid guard means for protecting one end of said vehicle, said guard means including a pair of laterally spaced side walls extending along the sides of and spaced outwardly from said vehicle, a pair of spaced coaxial pivot means respectively for connecting said spaced walls on the opposite lateral sides of said main frame for pivotal movement, each of said pivot means including a first pivot member having a tapered bore therein, means for connecting said pivot member on a side wall of the guard means so that the axis of said bore extends horizontally and transversely of said vehicle, a second pivot member and having a tapered bore, means for connecting said second pivot member in axial alignment with the bore in said first pivot member, said first and second bores respectively tapering oppositely of and away from each other, connecting means including a tension member extending through said bores, a head formed on said tension member and having a tapered conical surface complementary to and juxtaposed with the tapered bore of one of said pivot members, an annular bearing member carried on said tension member and having a tapered conical surface complementary to and juxtaposed with the tapered bore of the other of said pivot members, said connecting means including means coacting with said tension member to draw said bearing member and the head of said tension member into seated engagement with the respective tapered bores of said pivot members forcing the latter toward each other and thereby retaining the respective wall portion in thrust transmiting relationship with the main frame; and fastening means for releasably connecting said guard means to said main frame independently of and spaced from said pivot means, upon release of the fastening means said guard means being pivotable about said horizontal axis.

7. The combination set forth in claim 6 wherein each of said pivot means includes an annular wear ring disposed coaxially with said tension member and interposed between a side wall of said guard means and main frame, said wear ring being maintained in thrust transmitting relationship with said side wall and main frame by said connecting means.

8. The combination set forth in claim 7 wherein said fastening means comprise a pair of anchor connections respectively horizontally spaced from said pivot means, each of said pair of anchor connections including a first anchor member, means for connecting the latter on a side wall of the guard means; a second anchor member, means for connecting the latter on the lateral side of said main frame adjacent said side wall, the adjacent faces of said first and second anchor members respectively being provided with a set of horizontally extending serrations; and releasable tensioning means cooperating with said first and second anchor members for maintaining said set of serrations on the latter in interlocking engagement with the set on the former.

9. In a vehicle having a main frame, opposite lateral sides of said main frame having transverse openings adjacent one end of the vehicle and being aligned on a horizontal axis extending transversely of the vehicle, a rigid guard means for protecting said one end of said vehicle, said guard means including a pair of laterally spaced side walls, the lower portions of said side walls being disposed adjacent to and spaced outwardly from the lateral sides of said main frame and respectively having transverse openings coaxial with said openings in the main frame; a pair of pivot means respectively for connecting said spaced walls on the opposite lateral sides of said main frame for pivotal movement, each of said pivot means respectively including a first pivot member having a tapered bore, means for connecting said first pivot member in the opening in a side wall of said guard means, a second pivot member having a tapered bore, means for connecting said second pivot member in the opening at the adjacent lateral side of said main frame and having a bore coaxial with said transverse axis, said bores of the pivot members tapering oppositely of and away from each other and being aligned on the axis of said openings, connecting means including a tension member piloted through the tapered bores of said pivot members and having a head with a tapered conical surface formed on one end thereof, said conical surface being complementary to and juxtaposed with the face of one of said pivot members, a nut in threaded engagement with the opposite end of said tension member, a split annular bearing member coaxially carried on said tension member and having a tapered conical surface on one axial side being complementary to and juxtaposed with the face of the other of said pivot members, the opposite axial side of the bearing member being juxtaposed with said nut, an annular wear ring disposed coaxially with said tension member and being interposed between said side wall and the adjacent lateral side of said main frame, adjustment of said nut toward said head being operative to maintain said tapered split bearing member and said tapered head respectively in seated engagement with the tapered bores of said pivot members and thereby maintain said wall portion, wear ring and adjacent lateral side of the main frame into thrust transmitting relationship with each other; and fastening means for releasably connecting said guard means to said main frame independently of and spaced from said pivot means, upon release of said fastening means said guard means being pivotable about said transverse axis.

10. The combination set forth in claim 9 wherein said fastening means comprise a pair of anchor connections respectively spaced horizontally of said pivot means, each of said pair of anchor connections includes a first anchor member, means for connecting the latter in a second opening in said adjacent lateral side of the main frame; a second anchor member, means for connecting the latter in a second opening in said side wall coaxial with said second opening in the adjacent lateral side; a set of parallel horizontally extending serrations respectively formed on adjacent faces of each of said anchor members, the serrations of said first anchor member being complementary to and juxtaposed with the serrations of said second anchor member; and a pair of cap screws respectively being piloted through enlarged bores in said second anchor member and threaded into a threaded bore provided in said first anchor member to maintain said serrations in interlocking relationship thereby preventing relative movement between said guard means and said main frame about said transverse pivot axis.

References Cited in the file of this patent

UNITED STATES PATENTS

| Number | Name | Date |
|---|---|---|
| 1,088,471 | Sonnichsen | Feb. 24, 1914 |
| 1,104,864 | Ballou | July 28, 1914 |
| 1,186,763 | Fogli | June 13, 1916 |
| 1,315,789 | Newton | Sept. 9, 1919 |
| 1,352,918 | Rohbock | Sept. 14, 1920 |
| 1,377,814 | Drumb | May 10, 1921 |
| 1,434,456 | Sturgeon | Nov. 7, 1922 |
| 1,445,142 | Kirkham | Feb. 13, 1923 |
| 1,514,652 | Burmaster | Nov. 11, 1924 |
| 1,619,792 | Huff | Mar. 1, 1927 |
| 1,629,791 | Hoskins | May 24, 1927 |
| 1,986,981 | Ross | Jan. 8, 1935 |
| 2,322,630 | Greig | June 22, 1943 |
| 2,431,495 | Mosser | Nov. 25, 1947 |
| 2,444,058 | Miller | June 29, 1948 |
| 2,468,809 | Brock et al. | May 3, 1949 |
| 2,552,004 | Erdman | May 8, 1951 |
| 2,699,964 | Hartung | Jan. 18, 1955 |